Patented July 23, 1940

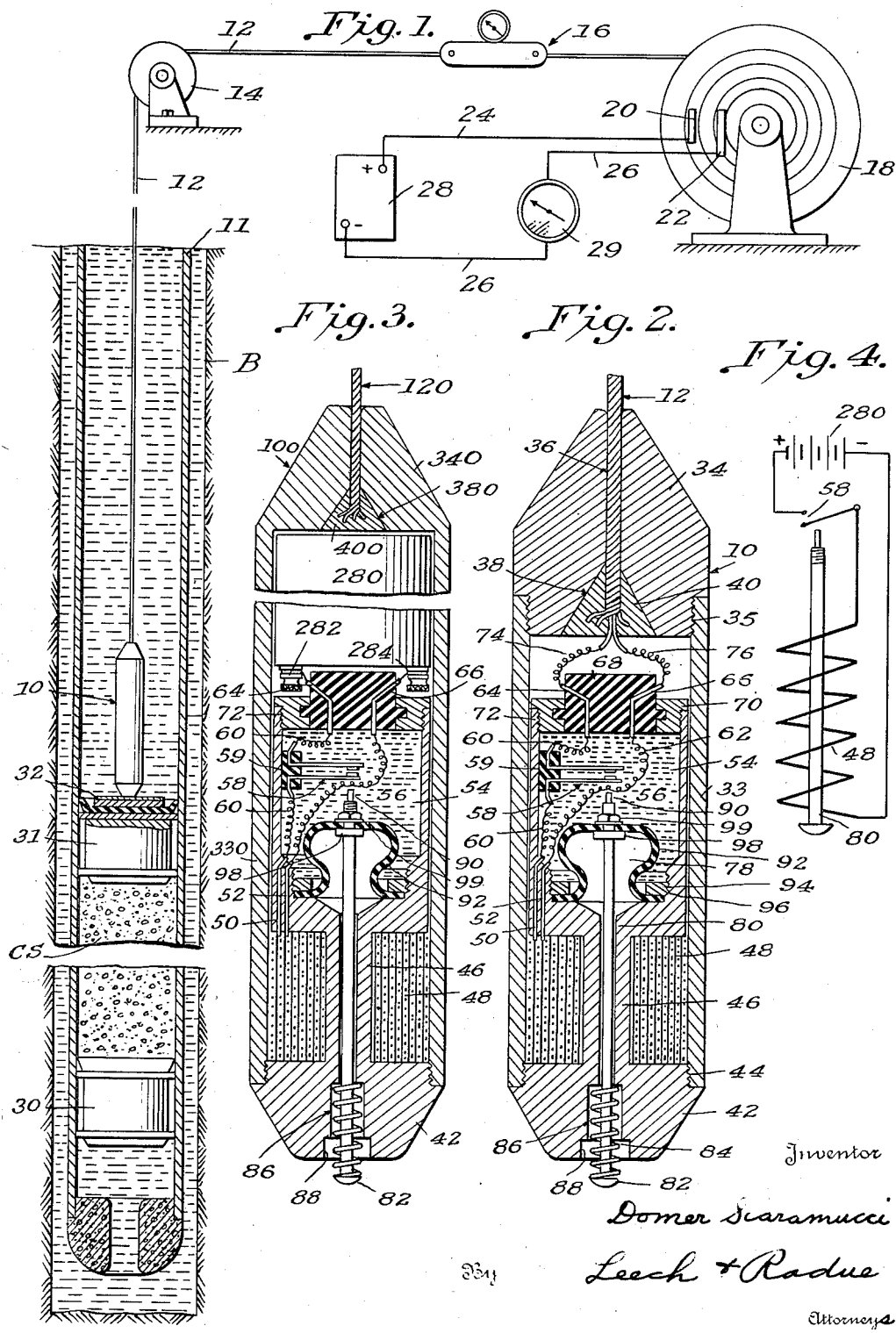

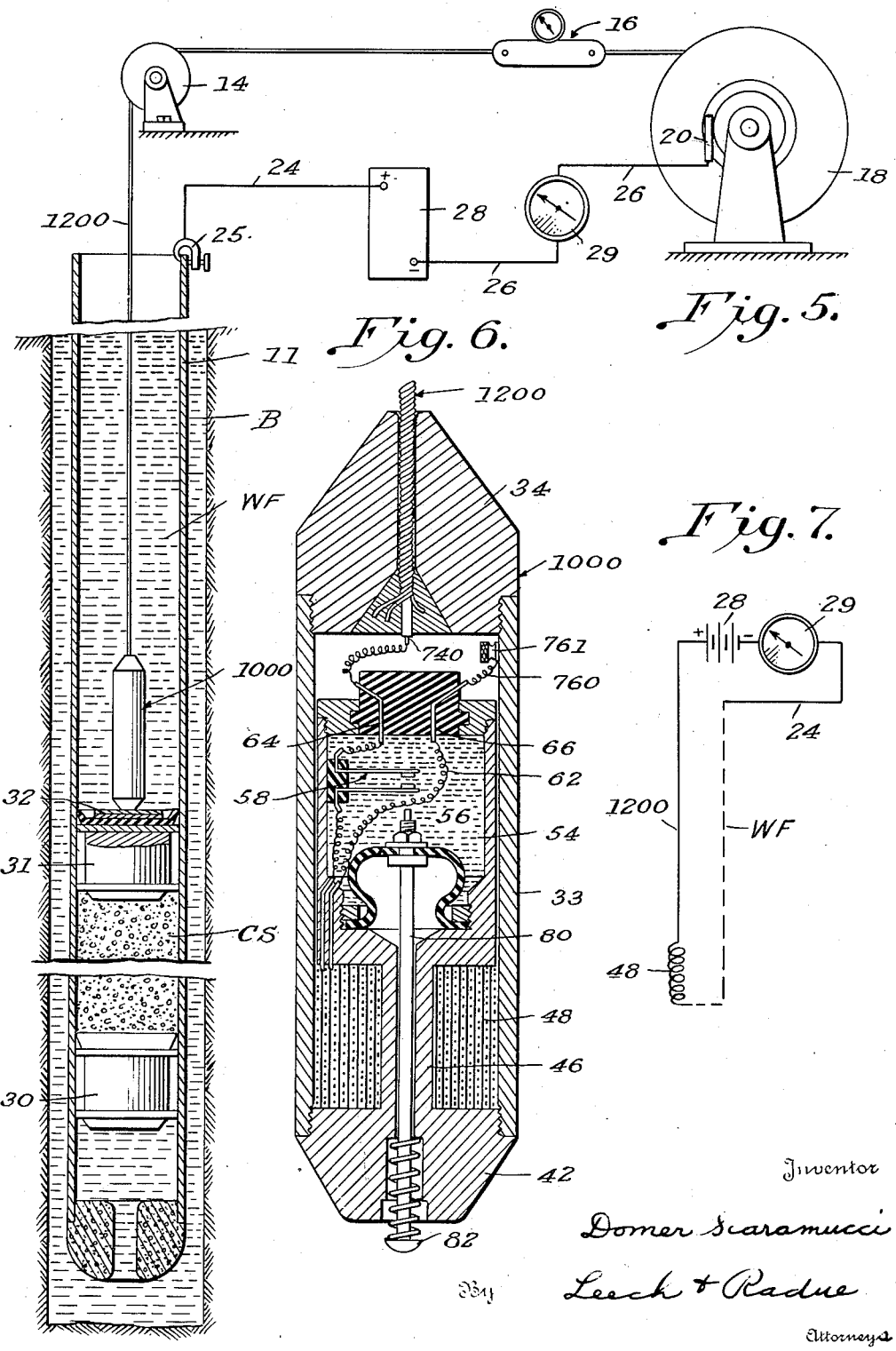

2,208,604

UNITED STATES PATENT OFFICE 2,208,604

SOUNDING APPARATUS FOR WELLS OR THE LIKE

Domer Scaramucci, Oklahoma City, Okla., assignor to Oil Equipment Engineering Corporation, Oklahoma City, Okla., a corporation of Oklahoma Application August 17, 1939, Serial No. 290,713

16 Claims. (Cl. 33—126.5)

The present invention pertains to sounding apparatus for wells or the like, and in particular, to apparatus suitable for determining the position of the cement slurry in an oil well which is to be cemented.

Reference is made to a co-pending application, Ser. No. 290,712, August 17, 1939, filed in the name of the present application in which the broad aspects of sounding magnetically for a cementing plug or other object in a well bore are set forth and claimed. No claim is made in the instant application to an upper or top cementing plug per se which is provided with magnetic means for cooperation with the sounding weight; that subject-matter is set forth in detail and claimed in the same co-pending application.

As has been indicated, the apparatus of this invention is applicable to the operation of cementing an oil well in which a cement slurry is inserted in a well casing, and forced downwardly thereof by means of hydraulic pressure acting on a cementing plug, for the purpose of sealing the well bore externally of the casing. The common practice of using an ordinary sounding weight and measuring line for this purpose is highly unsatisfactory for crooked wells, wells drilled to great depths and wells containing viscous fluid. In such instances, excessive line friction makes it exceedingly difficult to determine whether the sounding weight has encountered the plug or other object. Other factors making for inaccuracy of ordinary means are the downward hydraulic pressure on the sounding weight and plug and the speed with which the plug and cement must be forced through the casing of deep wells.

This invention contemplates the provision of improved measuring line apparatus for determining the position of a cementing plug or other object and comprises a sounding weight provided with electromagnet means for releasably coupling it to a cementing plug or other object which is provided with cooperative magnetic means. A suitable line is connected with the weight for suspending it in the well or the like and conventional means are utilized for measuring the length of the line to determine the position of the weight. Alternative embodiments comprise a sounding weight having a self-contained electromotive force, a sounding weight affording connections with a measuring line which serves also as means for conducting a surface source of electromotive force to the weight, and a sounding weight designed for cooperation with an electrolytic fluid in a metallic well casing, the casing and electrolytic fluid serving as one conductor from a surface electromotive source and an insulated measuring line serving as the other.

Therefore, a general object of this invention is to provide an electromagnet means associated with a sounding weight for cooperation with a cementing plug or other object adapted to move downwardly in a well or the like.

An additional object is to provide means for interrupting the magnetic force which this form of sounding weight is capable of exerting on the plug or other object.

A more specific object is to provide an electromagnetic sounding weight with switching means operable upon contact with a cementing plug or other object, which switching means is pressure-balanced to overcome the effect of hydrostatic pressure.

The preceding and other features and advantages of the invention will be better understood and appreciated from a reading of the following detailed description of specific embodiments and applications in connection with the accompanying drawings, in which—

Fig. 1 is a side elevation, partly in longitudinal section, of an oil well having a casing inserted therein and measuring line apparatus disposed for cooperation with a cementing plug within the casing;

Fig. 2 shows a longitudinal section to an enlarged scale of the sounding weight indicated in Fig. 1;

Fig. 3 is a similar longitudinal section of an alternative form of sounding weight;

Fig. 4 illustrates diagrammatically the electromagnetic circuit;

Fig. 5 is another side elevation, partly in longitudinal section, of an oil well having a casing inserted therein and measuring line apparatus disposed for cooperation with a cementing plug in which the casing constitutes an electric conducting element;

Fig. 6 shows a detailed longitudinal section of the sounding weight of Fig. 5; and Fig. 7 illustrates diagrammatically the electromagnetic circuit of this form of sounding weight.

The preferred sounding apparatus illustrated in Fig. 1 comprises an electromagnetic sounding weight 10 which is suspended within a well casing 11 on a flexible measuring line 12. A well bore B surrounds the casing 11 with an annular space therebetween. At the head of the casing 11, a guide pulley 14 which is provided with a conventional revolution counter (not shown) measures the line 12 as it is fed into the well bore B. From the pulley 14, the measuring line passes through a weight indicator 16 of conventional form and onto a winding reel 18 which serves to raise and lower the weight 10 as desired.

In the embodiment of Fig. 1, a two-conductor line (12) is used and the reel 18 is provided with taps 20 and 22 for connecting the respective conductors to the leads 24 and 26, respectively, of an electric circuit which will not be described. Lead 24 is connected to one terminal of an electromotive force 28, illustrated as a storage battery, and lead 26 is connected to the other terminal of said battery with a galvanometer or other current-indicating means 29 in circuit therewith.

In the oil well of Fig. 1, a cement slurry CS is traveling downward within the casing 11 between a bottom cementing plug 30 of ordinary form and a top cementing plug 31 which is characterized by a magnetic element or plate means 32 affixed to its upper end for cooperation with the electromagnetic sounding weight 10.

As shown in the detailed section of Fig. 2, the electromagnetic weight 10 comprises a hollow cylindrical body portion 33 having a conical end piece 34 secured by a threaded connection 35 to its upper end. The conical end piece 34 is provided with a small longitudinal bore 36 through which is passed an end of the line 12. A satisfactory anchor for the line 12 is provided by filling a conical recess 38 in the lower end of portion 34 with a moldable plug 40 of soft metal which will bond to said line 12. Attention is now directed to a lower conical end portion 42 of cast iron or other magnetic material which is secured by a threaded connection 44 to the body portion 33. Within the body portion 33, the end portion 42 is provided with a greatly reduced cylindrical portion 46 which provides a recess for the coil of an electromagnet 48 which is wound thereon. A pair of connectors 50 and 52 extend from the upper end of the magnet 48 into a chamber 54 formed within the upper end of the portion 42. The chamber 54 is filled with a non-corrosive fluid 56, such as oil, for purposes which will be explained subsequently. An electric switch 58, which is normally and resiliently held open, is supported within the chamber 54 by a plug 59 of insulation. The switch 58 is placed in circuit with a lead 60 that extends from the electromagnet connector 50. A second lead 62 is joined to the connector 52. At the upper end of the chamber 54, a pair of conducting strips 64 and 66 are connected to the leads 60 and 62, respectively. An insulating plug 68 maintains the conducting strips 64 and 66 in spaced relation and is supported in a cap member 70 which completes the closure of the chamber 54. Cap member 70 has a threaded connection 72 with the upper extremity of the lower end portion 42, which fits as a sleeve within the hollow cylindrical body portion 33. The upper exposed ends of the strips 64 and 66 are connected respectively to the independent conductors 74 and 76 on the line 12.

In order to provide means for actuating the switch 58, the end portion 42 slidingly receives a movable member or reciprocating rod 78 in an axial bore 80. The lower end of the rod 78 has an enlarged head portion 82 which is projected beyond the lower end of the weight 10 by a spring 84 mounted within a larger bore 86 co-axial with the bore 80. An additional counter-bore 88 extending from the lower end of portion 42 receives the head 82 of the rod 78 so that the rod may be wholly retracted within the weight 10 and the end 42 of the electromagnet engage the magnetic portion 32 of plug 31. The reciprocating rod 78 has an upper end 90 disposed within the chamber 54 so as to close the switch 58 when it is moved upwardly into contact with the lower portion thereof.

Pressure-balancing means is provided in the form of a resilient diaphragm 92, preferably of rubber, which closes the lower end of the chamber 54 and is clamped in sealing relation at its edges by a ring 94 having a threaded connection 96 with the enclosed part of the portion 42. The switch-actuating rod 78 extends through the central portion of diaphragm 92, to which it is clamped by means of a collar 98 and a nut 99.

When the elongated sounding weight 10 is lowered into contact with the top cementing plug 31 or other object, the rod 78 will be reciprocated by such contact to close the switch 58 and activate the electromagnet 48 and its magnetic core, which is the end portion 42 of said weight. The strong magnetic field thus produced will join the weight 10 to the magnetic plate 32 of plug 31. At the time the electric circuit is closed by actuation of switch 58, the current-indicating means 29 at the surface of the well will disclose this fact to the operator. A definite reaction can be obtained in the weight indicator 16 by braking or retarding the reel 18 to separate the weight 10 and plug 31. The strength of the magnetic field which is created is, of course, not sufficient to raise plug 31 with the weight 10 against the downwardly acting hydraulic pressure or to prevent their separation when the measuring line is held stationary. By means of the reel 14, the operator will measure the depth to which the weight 10 is suspended within the casing 11 either at the time the electric circuit is closed or at the time of opening and separation, when a decided change in measuring line tension will be shown at the weight indicator 16. The switch 58 will also be opened and the current-indicating means 29 will provide a further check. In this manner, it is possible for the operator to determine accurately the position of the plug 31 and the underlying cement CS at all times during the travel of the latter within the casing 11, and regardless of line friction or other effects which render ordinary sounding method inaccurate.

The head 82 of the switch-actuating rod 78 is subjected to considerable hydrostatic pressure in a deep well, and this pressure is, through the bore 80, also effective on the lower side of the resilient diaphragm 92 which seals the bottom of the switch chamber 54. For this reason, the chamber 54 is filled with an incompressible fluid which acts downwardly on the diaphragm 92 to produce a pressure-balancing effect.

Instead of a two-conductor measuring line, an ordinary flexible wire line 120 (Fig. 3) extends through the upper conical end 340 of the weight 100 and is retained in a conical recess 380 by the molded metal plug 400. It will be obvious, that the hollow cylindrical body portion 330 of the weight 100 is integral with the upper end portion 340 and that a suitable battery 280 is enclosed by said body portion 330 above the switch chamber 54. The leads 64 and 66 are connected to the battery terminals 282 and 284, respectively. Otherwise, the sounding weight 100 is similar in its details to the principal embodiment of Figs. 1 and 2. However, with this modification, no surface indication of the state of the electromagnet circuit will be obtained and the operator will rely wholly upon the feel of the line or the operation of the weight indicator 16.

In the further alternative form of invention illustrated in Figs. 5, 6 and 7, an electromagnetic sounding weight 1000 is supported by a single conductor measuring line 1200 leading over the pulley 14, weight indicator 16, and reel 18 in the manner which has been described previously. The tap 20 connects the conductor of line 1200 with the lead 26, battery 28, and galvanometer 29. The other terminal of the battery 28 is joined to a lead 24 having a connecting means 25 for uniting it electrically with the metallic well casing 11. The casing 11 contains a well fluid WF of an electrolytic nature, the purpose of which is to be described.

The close similarity between the modified sounding weight 1000, shown in Fig. 6, and the forms which have been disclosed above will be apparent. Note is taken that the strip 64 leading from the make-and-break switch 58 in connected to the single conductor 740 of the measuring line 1200 and that the other strip 66 is joined by a lead 760 to a connector 761 secured to the inside of the upper end of the cylindrical body portion 33. The lower end portion 42 of weight 1000 is of suitable magnetic material, such as cast iron, but the cylindrical body portion 33 and upper conical end portion 34 may be made of a corrosion-resisting metal, for example brass. Therefore, the electrolytic well fluid WF will serve to transmit current from the casing 11 to the electromagnet lead 62 through the metallic body of the weight. Except for the different manner in which one part of the electric circuit is joined to the electromagnet coil 48, the operation of this apparatus is identical with that which has been described in connection with Figs. 1 and 2.

The foregoing disclosures of the preferred and alternative form of apparatus are intended only to be illustrative of the invention, since it will be apparent to those skilled in this art that variations and modifications can be made which will come within the scope and spirit of the appended claims.

Having thus described my invention, what I desire to secure by Letters Patent of the United States is set forth in the following claims:

1. Apparatus for use in cementing a well comprising a measuring line, an elongated sounding weight secured to the measuring line and having electromagnet means associated with its lower end, and a top cementing plug having a magnetic portion arranged to engage the electromagnetic means of the weight.

2. Apparatus for use in cementing a well comprising a measuring line, an elongated sounding weight secured to the measuring line and having electromagnet means associated with its lower end, a top cementing plug having a magnetic portion arranged to engage the electromagnetic means of the weight, and means including an electric switch connected to said weight for operating the electromagnet means when the plug is engaged.

3. In apparatus for use in oil wells or the like, the combination comprising a measuring line; an elongated weight member secured to said line, said weight member having electromagnet means associated with its lower end; means connected to the weight member for operating the electromagnet means; and a body adapted to move in a well below the weight member, said body having a portion of magnetic material arranged to engage the electromagnet means of the weight, whereby the magnetic force of attraction will be manifested in the measuring line as the weight member and body are magnetically engaged and disengaged.

4. A sounding apparatus which includes a line, an elongated sounding weight secured to said line and having electromagnet means associated with its lower end, and means forming a part of the weight for breaking the circuit of the electromagnet means.

5. A sounding apparatus which includes a line, an elongated sounding weight secured to said line and having electromagnet means associated with its lower end, a switch within the weight for breaking the circuit of the electromagnet means, and a pressure-balanced member normally extended below the weight for operating said switch.

6. A magnetic sounding weight which includes a magnetic end, a hollow body portion, an electromagnet coil associated with the magnetic end, a make-and-break switch in circuit with the coil, and an operating member for the switch extending from the magnetic end of the weight, said operating member being wholly retractible within the weight.

7. A sounding weight having a magnetic end, a chambered body portion, an electromagnet coil encircling the magnetic end within the body portion, a switch within the body portion and in circuit with the electromagnet coil, a movable operating member for the switch biased outwardly of the weight, and pressure-balancing means within the body portion for counteracting external hydraulic pressure on the operating member.

8. A magnetic sounding weight comprising a hollow body portion, a conical end secured to the upper end of the body portion and adapted to secure a measuring line, an end portion of magnetic material secured to the lower end of the body portion and having a coil surrounding it to form an electromagnet, switch means forming a part of the weight and in circuit with the coil of the electromagnet, and an operating member for the switch arranged for actuation by means external of the weight.

9. A sounding weight comprising a body portion, an electromagnet at an end of the body portion, battery means forming a part of the weight and operatively connected to the electromagnet, and means operable externally of the weight for controlling the action of the electromagnet.

10. Measuring apparatus for determining the position of a magnetic object in a well or the like, comprising in combination, an elongated sounding weight having electromagnet means associated with its lower end; an electric switch within said weight in circuit with the electromagnet means; a reciprocable pin extending below the weight for operating the switch when the weight carries the pin into contact with the object; diaphragm means to which the pin is secured; a body of fluid within the weight on one side of the diaphragm, the other side of the diaphragm being exposed to the pressure of the fluid in the well or the like; a measuring line including two separate conductors in circuit with the switch; a measuring device for determining the length of the end of the line adjacent the weight; means for reeling the line; and galvanometer means in circuit with the line conductors for definitely indicating the time at which the switch is operated.

11. Measuring apparatus for determining the position of a magnetic object in a well or the like, comprising in combination, an elongated sounding weight having electromagnet means associated with its lower end; an electric switch within said weight in circuit with the electromagnet means; a movable member extending below the weight for operating the switch when the weight carries the member into contact with the object; a measuring line including two separate conductors in circuit with the switch; a measuring device for determining the length of the end of the line adjacent the weight; means for reeling the line; electric means in circuit with the line conductors for definitely indicating the time at which the switch is operated; and means associated with the line for indicating changes in the effective weight thereon as the sounding weight magnetically engages and disengages an object.

12. In apparatus for use in oil wells or the like, the combination comprising a measuring line; an elongated weight member secured to the measuring line and having electromagnet means associated with its lower end; battery means carried by said weight and in circuit with the electromagnet means; means including an electric switch carried by said weight for operating the circuit of the electromagnet means from without the weight; and a body adapted to move in a well below the weight member, said body being provided with a magnetic portion arranged to engage the magnet means of the weight, whereby the magnetic force of attraction will be manifested in the measuring line as the weight member and body are magnetically engaged and disengaged.

13. In apparatus for use in oil wells or the like, the combination comprising a measuring line; an elongated weight member secured to the measuring line and having electromagnet means associated with its lower end; battery means carried by said weight and in circuit with the electromagnet means; means including an electric switch connected to said weight for operating a circuit of the electromagnet means from without the weight; a body adapted to move in a well below the weight member, said body being provided with a magnetic portion arranged to engage the magnet means of the weight, whereby the magnetic force of attraction will be manifested in the measuring line as the weight member and body are magnetically engaged and disengaged; lineal measuring means operated at the surface by the line; and a weight indicator associated with said line at the surface.

14. Measuring apparatus for determining the position of a magnetic object in a well or the like, comprising in combination, an elongated sounding weight having electromagnet means at its lower end; an electric switch within said weight in circuit with the electromagnet means; battery means within the weight and also in circuit with said electromagnet means; a reciprocable pin extending below the weight for operating the switch when the weight carries the pin into contact with the object; diaphragm means to which the pin is secured; a body of fluid within the weight on one side of the diaphragm, the other side of the diaphragm being exposed to the pressure of the fluid in the well or the like; a measuring line secured to the weight; a measuring device cooperating with the line for determining the depth to which the weight has been lowered; means for reeling the line; and weight indicator means at the surface in contact with the line.

15. A sounding apparatus comprising in combination, a body of electrolytic fluid; a conductor adapted to be placed in electrical contact with said fluid; an elongated sounding weight adapted to be lowered into the fluid and having electromagnet means associated with its lower end; a two-terminal electric switch enclosed by the weight and in circuit with the electromagnet means; a weight line comprising an insulated electrical conductor connected to a terminal of said switch, the other terminal being connected to a metallic portion of the weight which is exposed to the electrolytic fluid; a movable switch-operating member projecting from the weight; and means for indicating the flow of electric current in the circuit comprising the first-mentioned conductor, the electrolytic fluid, the exposed metallic portion of the weight, the electromagnet means, the switch, and the line conductor.

16. A sounding apparatus comprising, in combination, a metallic well casing containing a body of electrolytic fluid; an elongated sounding weight adapted to be lowered into the fluid and having electromagnet means associated with its lower end; a two-terminal electric switch enclosed by the weight and in circuit with the electromagnet means; a weight line comprising an insulated electrical conductor connected to a terminal of said switch, the other terminal being connected to a metallic portion of the weight which is exposed to the electrolytic fluid; a movable, pressure-balanced, switch-operating member projecting from the weight; and means for indicating the flow of electric current in the circuit comprising the well casing, the electrolytic fluid, the exposed portion of the weight, the electromagnet means, the switch, and the line conductor; and a body adapted to move in the well casing below the weight, said body including a magnetic portion arranged to engage the electromagnet means of the weight, whereby the magnetic force between them will be manifested in the weight line.

DOMER SCARAMUCCI.